Figure 1:
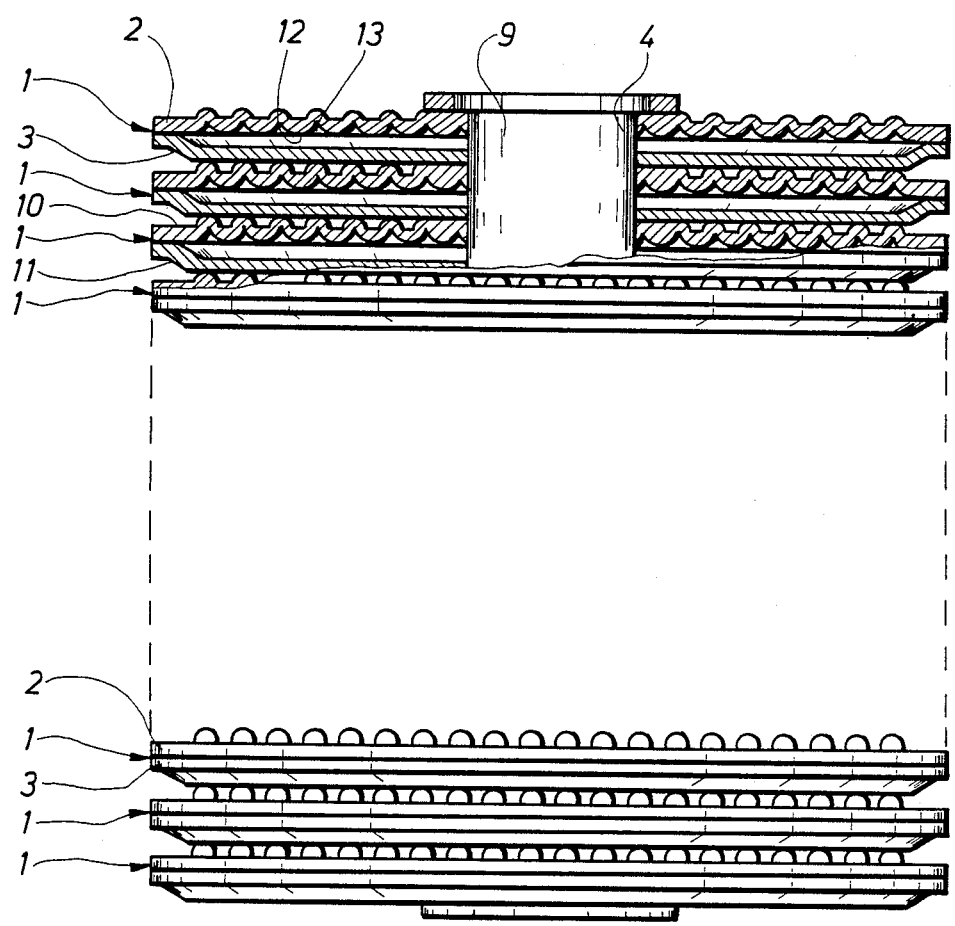

United States Patent [19]

Jensen et al.

[11] Patent Number: 4,549,963
[45] Date of Patent: Oct. 29, 1985

[54] FILTERING DEVICE COMPRISING ONE OR MORE FILTERING ELEMENTS CONSISTING OF FILTERING DISCS

[75] Inventors: Carl A. Jensen; Ib O. Rasmussen, both of Svendborg, Denmark

[73] Assignee: C. C. Jensen A/S, Svendborg, Denmark

[21] Appl. No.: 523,057

[22] Filed: Aug. 15, 1983

[30] Foreign Application Priority Data

Aug. 26, 1982 [DK] Denmark ............................ 3821/82

[51] Int. Cl.⁴ ...................... B01D 29/06; B01D 29/34
[52] U.S. Cl. .................................... 210/314; 210/331; 210/486; 210/488; 210/493.1
[58] Field of Search ............... 210/314, 316, 331, 461, 210/486, 487, 488, 489, 492, 493.1, 493.5, 497.01, 497.2, 503, 505; 55/498, 521

[56]  References Cited

U.S. PATENT DOCUMENTS

| | | | |
|---|---|---|---|
| 1,861,805 | 6/1932 | Lentz | 210/493.1 |
| 2,770,370 | 11/1956 | Griffiths | 210/488 |
| 3,231,094 | 1/1966 | Wiegand | 210/493.1 |
| 3,261,474 | 7/1966 | Parker et al. | 210/493.5 |
| 3,263,819 | 8/1966 | Schmidt et al. | 210/488 |
| 3,473,668 | 10/1969 | Bunyard et al. | 210/492 |
| 3,493,119 | 2/1970 | Allen | 210/489 |
| 4,243,536 | 1/1981 | Prölss | 210/461 |

FOREIGN PATENT DOCUMENTS

| | | |
|---|---|---|
| 1761592 | 7/1973 | Fed. Rep. of Germany . |
| 168417 | 9/1959 | Sweden . |
| 224923 | 2/1969 | Sweden . |
| 1504135 | 3/1978 | United Kingdom . |

Primary Examiner—Richard V. Fisher
Assistant Examiner—Wanda L. Millard
Attorney, Agent, or Firm—Cushman, Darby & Cushman

[57]  ABSTRACT

In a filtering device comprising one or more filtering elements (1) having in principle co-axially disposed through-going apertures (4) for the passage of fluid, the individual filtering element (1) consists of two identical filtering discs (2, 3) which abut each other closely along their outer peripheral edges, and which at the sides facing away from each other are formed in such a way that several filtering elements (1) abut each other closely along the inner edges adjacent to the aperture (4). To obtain a relatively large surface of penetration, a good deep-filtering capacity and a substantially even filtering velocity in principle in the entire filtering device, the filtering discs are corrugated outside the edge areas (5, 6) and simultaneously they are of such a planar shape that the crests at their adjacent sides, between the individual filtering elements (1) as well as between the individual filtering discs (2, 3), abut each other at the intersecting spots, the filtering discs (2, 3) being located relative to each other in such a way that confronting corrugations cross each other.

2 Claims, 2 Drawing Figures

FILTERING DEVICE COMPRISING ONE OR MORE FILTERING ELEMENTS CONSISTING OF FILTERING DISCS

The invention relates to a filtering device comprising one or more filtering elements having in principle co-axially disposed through-going apertures for the passage of fluid, said filtering element consisting of two identical filtering discs, which abut each other closely along their outer peripheral edges, and which at the sides facing away from each other are formed in such a way that several filtering elements abut each other closely along the inner edges adjacent to the aperture.

Filtering devices, especially filter cartridges to be used for filtering oils and having deep-filtering characteristics are often constructed as a cylindrical filtering body with an axial central hole. This body may be produced of many different materials, such as natural fibers, artificial fibers and mineral fibers, which may be bound together by binders. If the filtration in such cartridges takes place from the outside having the largest surface of penetration, the velocity of the fluid will increase towards the middle. As a result the particles to be deposited will be subjected to an increasing sluicing effect, which prevents an effective deposit of the articles to be removed. The effect will be that only the outer layer of the filter cartridge is used for filtering off the particles, whereas the filtering material around the center is wasted. Although the outer surface is the largest, it is, however, rather small, which will have the effect that the particles being too large to penetrate deeper into the cartridge, will quickly clog the surface and thereby prevent the ultilization of the deep-filtering capacity of the cartridge. This problem will become aggrevated if the large particles are flat or of a plastic character. If the filtration takes place from the inside and outwards, the surface of penetration will be even smaller, and the problem of clogging thereby greater, whereas the problem of utilizing the deep-filtering capacity is minor as a result of the velocity of flow decreasing on the way out through the cartridge.

The problem of maintaining an even filtering velocity through a deep-filtering device and simultaneously maintaining a relatively large surface has i.e. been solved by means of a so called fluted filter, which means a filter, in which the filtering element defines axially extending folds round a central hole. Fluted filters are, however, encumbered with the drawback that they have to be supported on the inside as well as on the outside to enable the filtering element to withstand the filtering pressure. As a result the filtering material as well as the supporting means are to be discarded when the filter cartridge is exhausted. In addition to that the depth of the individual folds is limited, as the filtering pressure has a tendency to flatten the individual folds and thereby make part of the filter unusable. A fluted filter must, if it has to have a large surface of penetration, either be very long or have a comparatively wide central hole. The first circumstance is disadvantageous as in regards to mounting, and the second one has the effect that the filter takes up a comparative amount of space. Fluted filters are further limited by the fact that the filtering passage cannot be very long, as the material, if particularly thick, cannot take up the deformations during the bending of the folds, and as a result the fluted filter will in the bendings have a considerably poorer filtration capacity.

The problems of combining a large surface of penetration with deep-filtering capacities are often solved by means of a circular sheet provided with a central hole, said plate being supported by a body containing drainage channels on the reverse, so that the filtrate can emerge from the filter after filtration. This method makes the use possible of a filtering disc with considerable space for the kinds of impurities which can only be removed efficiently by deep-filtration, but the drainage/supporting element is comparatively expensive, and in the case of a disposable filtering element, it has to be discarded when the filtering device is exhausted.

The filtering device according to the invention is characterized in that the filtering discs are corrugated outside the edge areas and are moreover of such a planar shape that the crests at their adjacent sides, between the individual filtering elements as well as between the individual filtering discs, abut each other at the intersecting spots, the filtering discs being located relative to each other in such a way that confronting corrugations cross each other.

It is hereby obtained that a filtering device is provided which is comparatively cheap to manufacture and utilize, the filtering device merely consisting of identical filtering discs, which simultaneously function as filtering material and supporting disc for each other. Simultaneously, because of the corrugations a good deep-filtering capacity is obtained by a suitable choice of thickness of the filtering discs together with a relatively large surface of penetration. The closely abutting areas along the periphery and the edge of the apertures, respectively, serve to seal the filtering discs mutually along the periphery and to seal the filtering elements mutually immediately near the hole. The filtrated fluid is hereby prevented from passing radially through the filtering device without passing a filtering disc. The corrugations make comparatively good room between the filtering discs for the filter cake. The filtering device may be used for filtration, from the outside and in the direction towards the co-axially disposed through-going apertures as well as from the inside and out towards the periphery of the filtering device. The outlet side of each individual filtering disc enables the filtrate to flow out, and the filtering pressure is absorbed by the crests so that the drainage channels are not pressed together. The filtering device thus makes room for a comparatively large filter cake (surface impurities) as well as for a comparatively great amount of deep-filtering impurities, and simultaneously the filtering velocity remains in all essentials unchanged thrugh the entire filtering device.

In an especially advantageous embodiment according to the invention the filtering discs may be of such a corrugation that the crests are wider on the outlet side than on the inlet side, whereby the supporting effect will be particularly good.

In an especially simple embodiment according to the invention the crests on the sides of the filtering elements facing away from each other are positioned in the same plane as the area at the inner edge of the aperture and the crests of the confronting filtering discs in the individual filtering elements are positioned in the same plane as the area at the outer peripheral edge.

Figure 2:
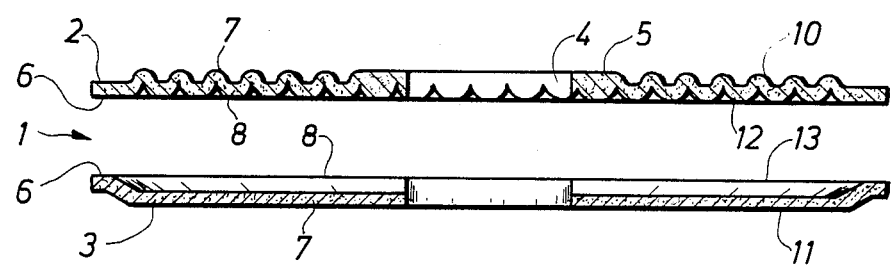

The invention will be described below with reference to the accompanying drawing, in which FIG. 1 is a side view (with parts axially intersected for the sake of clarity) of a preferred embodiment of a filtering device, FIG. 2 is a sectional view of a single filtering element, in which the two filtering discs thereof have been removed from each other.

The filtering device shown in FIG. 1 comprises a pile of filtering elements each consisting of two identical filtering discs 2 and 3, cf. especially FIG. 2. Each filtering disc is circular and comprises a centrally disposed through-going aperture 4. On one side of each individual filtering disc a plane area 5 is provided adjacent to the edge of the aperture 4 and extending perpendicular to the central axis. On the opposite side a plane area 6 is provided extending perpendicular to the axis and adjacent to the edge along the outer periphery of the disc. In all essentials, outside these plane areas each individual filtering disc 2,3 is shaped with parallel corrugations 7,8 on both sides of the filtering discs. These corrugations 7,8 are located in such a way that the troughs on one side are placed opposite the crests on the other side of the filtering discs. When mounted the filtering discs 2, 3 are located in such a manner that the outer plane areas 6 disposed along the periphery abut each other in each filtering element 1, whereas the filtering elements abut each other along the inner plane areas 5. In the individual filtering elements the two filtering discs are located symmetrically around an intermediate radial plane, apart from the fact that they—as will appear from the drawing—have been revolved 90° relative to each other on their common axis. The filtering device shown in FIG. 1 is mainly intended for filtration by flow from the outside and through the filtering discs and into the central channel 9 formed by the co-axially disposed apertures 4. The sides facing away from each other of the individual filtering element 1 thus dfine inlet sides 10, 11 for the fluid to be filtrated, whereas the opposite sides of the filtering discs 2, 3 in the filtering element 1 define the outlet sides 12, 13 of the filtering element.

As will appear from the drawing, the crests of each individual filtering disc are formed so that the crests of the outlet sides 12, 13 are wider than those of the inlet sides 10, 11. In addition the corrugations are formed in such a way that the crests of the abutting sides everywhere in the filtering device abut each other within the areas where the corrugations intersect, as the corrugations of every second filtering disc in the entire filtering device extend parallel to each other.

The crests are—as will appear from the drawing—also shaped in such a way that they are in the same plane as the plane area of the side in question, i.e. the plane area 5 adjacent to the edge of the aperture 4 or the area 6 situated along the periphery.

The filtering discs may be made of many different materials, but in a preferred embodiment they are made of about 75 percent of semi-chemical corrugated cellulose and about 25 percent of cotton linters and about 0.2 percent of polyamine. The filtering discs are glued together, preferably by means of polyurethane glue along the abutting plane areas 5, 6.

When mounted the filtering device is used for filtration of fluids, such as oils, pressed through the filtering device in substantially radial direction. Thereby the fluid is allowed to flow along the troughs between the individual filtering elements on their inlet sides, and from here through the individual filter disc to the inner of the filtering element and then to the outlet sides of the filtering discs 2, 3 from where it flows on to the through-going channel 9 of the filtering device. This filtering device thus has a very large inlet or penetration surface and thus a very great capacity compared to its size. If desired, the filtering device may also be used for filtration in the opposite direction.

The invention has been described with reference to a preferred embodiment. Many variations may be made without thereby deviating from the scope of the invention. Each individual filtering disc may e.g. be of a shape other than the circular one, and the corrugations may be of many different shapes. The plane areas 5, 6 may have different extensions according to wishes and requirements.

We claim:

1. A filtering device comprising at least one filtering element, the filtering element comprising first and second identical filter discs joined at their peripheral edges, the filter discs having a series of parallel corrugations, means defining an aperture extending through the center of the discs for the passage of fluid, said parallel corrugations forming fluid flow channels in communication with said aperture, a first annular plane area around each of the apertures and defining the outer face of the filter disc, and a second annular plane area at the periphery on the inner face of each of the filter discs, the two discs joined together with the second annular plane areas abutting each other such that the first annular plane areas face outward from the filter element and the corrugations of the first disc are situated such that they intersect the corrugations of the second disc, the corrugations of each disc having crests which lie in substantially the same plane as the first annular plane area, the corrugations further having troughs located substantially in the same plane as the second annular plane area, the filter element capable of being joined with a second filter element having the first annular plane areas abutting each other.

2. A filtering device according to claim 1 wherein the crests of the corrugations of the filter discs are wider on the inner face than on the outer face.

* * * * *